Aug. 26, 1941.    J. W. LINDLY    2,253,633
ENSILAGE HARVESTER
Filed June 17, 1940    4 Sheets-Sheet 1
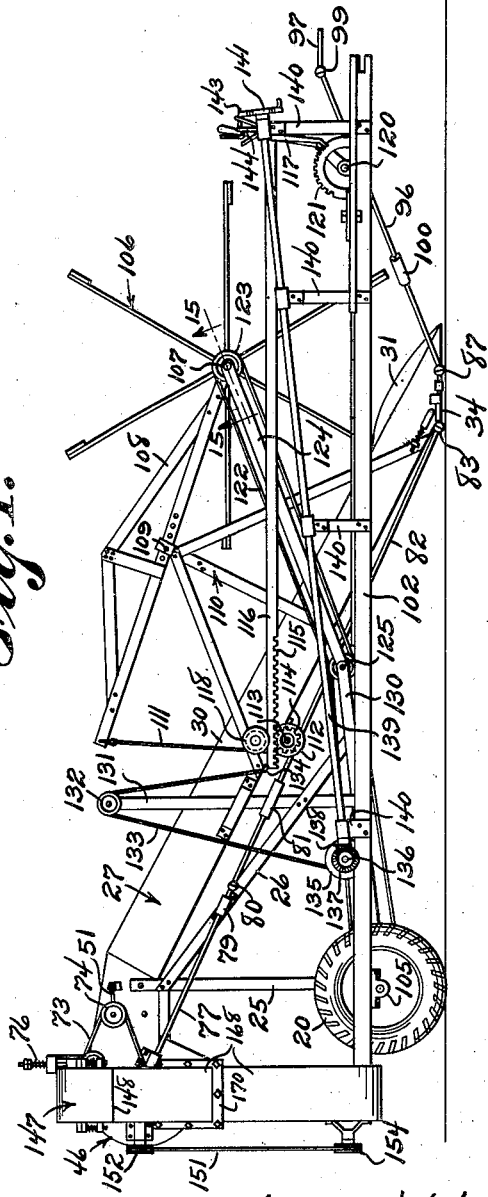
James W. Lindly
INVENTOR
BY Victor J. Evans & Co.
ATTORNEYS

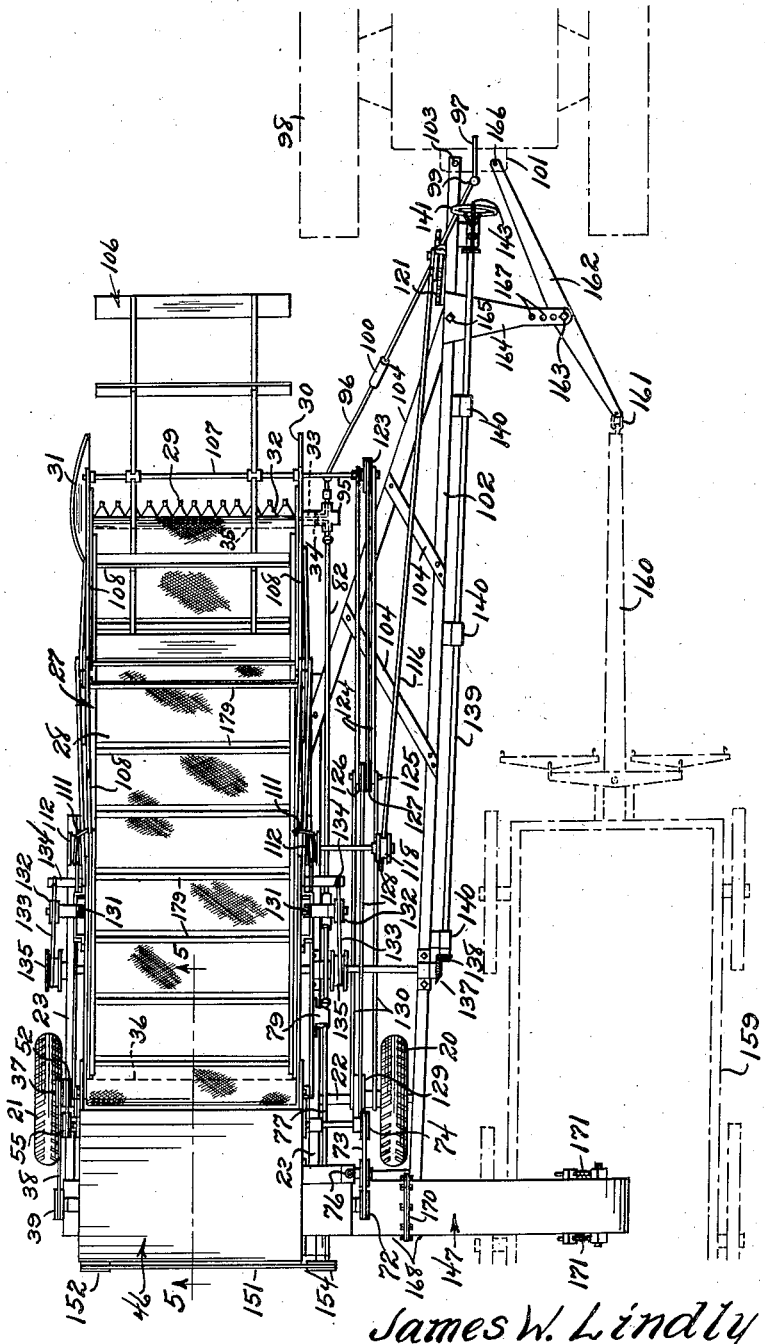

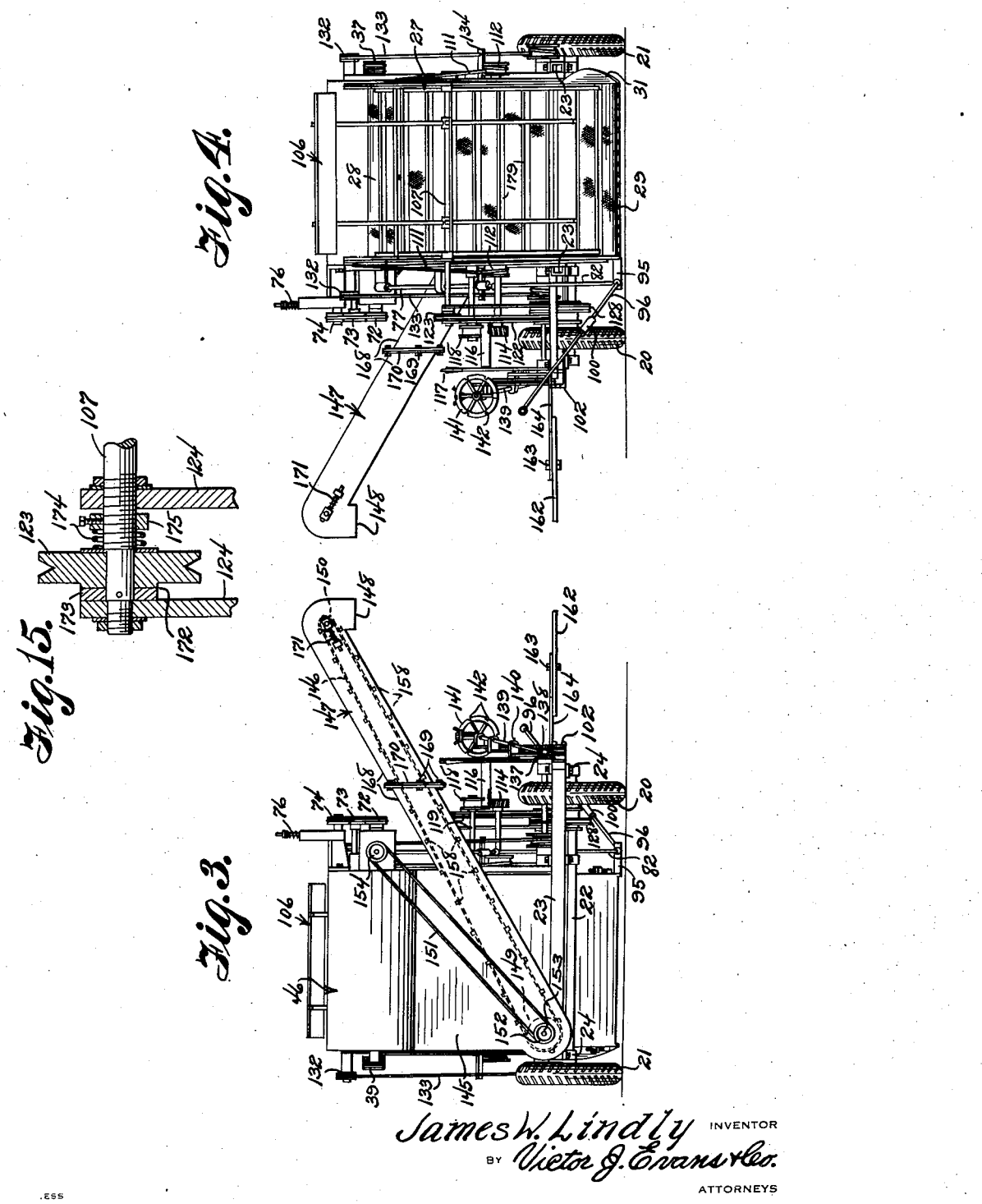

Aug. 26, 1941.        J. W. LINDLY         2,253,633
                    ENSILAGE HARVESTER
                  Filed June 17, 1940         4 Sheets-Sheet 4
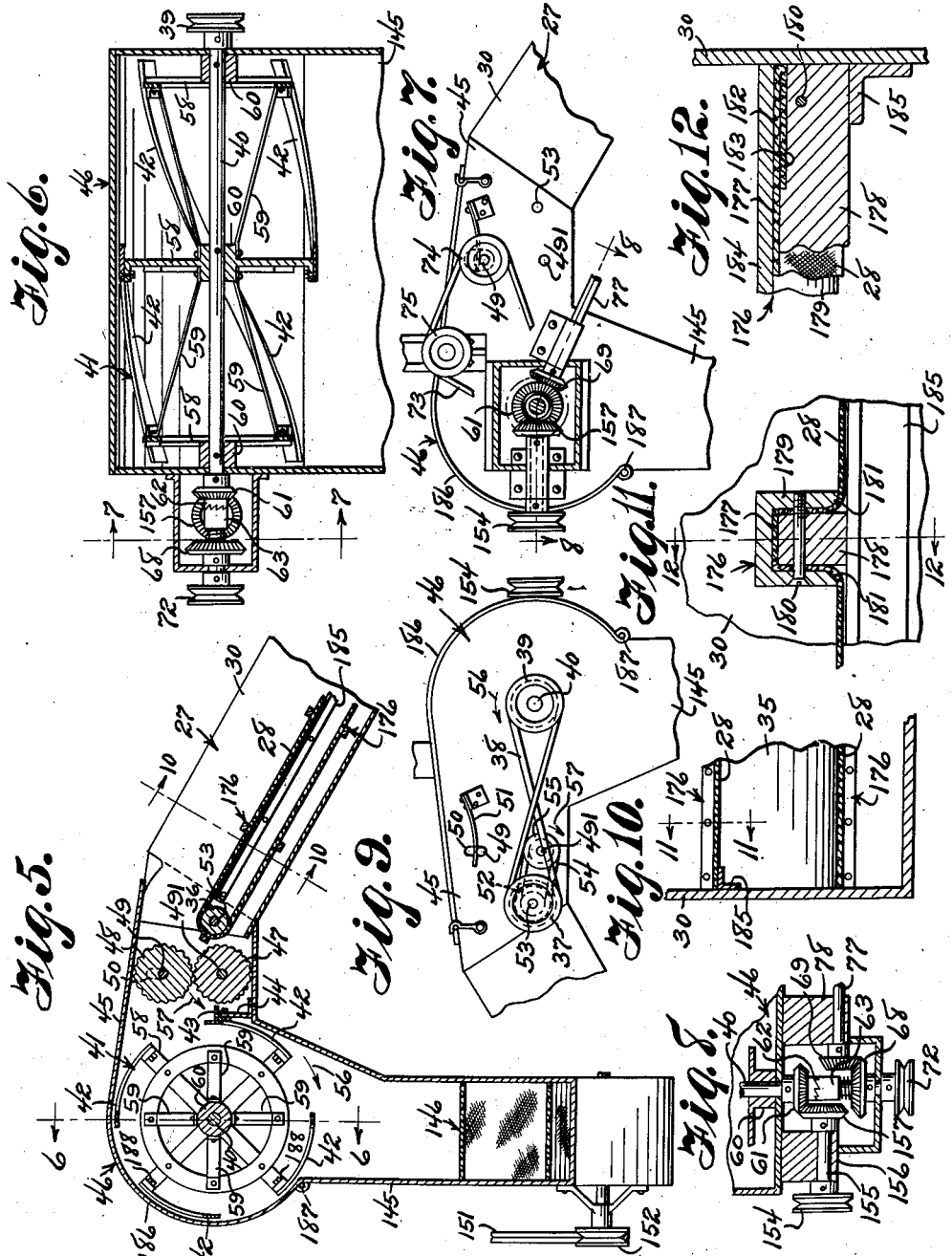
James W. Lindly INVENTOR
BY Victor J. Evans & Co.
ATTORNEYS Patented Aug. 26, 1941

2,253,633

UNITED STATES PATENT OFFICE 2,253,633

ENSILAGE HARVESTER

James W. Lindly, Welch, Tex.

Application June 17, 1940, Serial No. 341,043

3 Claims. (Cl. 56—16)

My invention relates to harvesting machinery for cutting standing crops and for reducing the crop to ensilage; and the objects of my improvement are, first, to provide a machine capable of handling any one of the many crops grown for ensilage purposes; second, to provide a machine adapted to handle crops which are sown by the broadcast method; third, to afford facilities for the crop adjustment of the machine for accommodating the same to variable crop conditions, particularly with respect to the height of the growth; fourth, to provide a machine embodying traveling conveyors for handling the crop, in which the conveyors are moisture resistant so as to facilitate harvesting under wet or dry atmospheric conditions; and, fifth, to provide a machine which may be drawn by a tractor and so devised as to enable the operator of the tractor to control the machine from a position on the tractor.

In the accompanying drawings:

Figure 1 is a side elevational view of a machine in accordance with my invention;

Figure 2 is a top plan view of the machine illustrating its connection with a tractor and the manner in which a wagon or the like may be associated with the machine for collecting the ensilage;

Figure 3 is a rear elevational view;

Figure 4 is a front elevational view;

Figure 5 is a sectional view taken along the line 5—5 of Figure 2;

Figure 6 is a sectional view along the line 6—6 of Figure 5;

Figure 7 is a view taken from the position indicated by line 7—7 of Figure 6;

Figure 8 is a sectional view along the line 8—8 of Figure 7, with the gears and shaft parts illustrated in elevation;

Figure 9 is an end elevational view of the cutter cylinder housing illustrating the driving mechanism for the elevating canvas and one of the feed rolls;

Figure 10 is a sectional view along the line 10—10 of Figure 5;

Figure 11 is an enlarged sectional view along the line 11—11 of Figure 10;

Figure 12 is a sectional view along the line 12—12 of Figure 11;

Figure 13 is a sectional detail view of a slip clutch associated with the pitman crank for operating the sickle;

Figure 14 is a view illustrating a dog clutch release for the cylinder cutter; and Figure 15 is an enlarged sectional view along the line 15—15 of Figure 1.

In the embodiment selected to illustrate my invention, I make use of supporting wheels 20 and 21 mounted on an axle 22 carried by a frame 23 best illustrated in Figs. 2 and 3. Axle 22 is rotatably journaled in bearings 24 carried by the frame 23. Fig. 1 illustrates frame members 25 and 26 which extend upwardly from the frame 23 and have their upper ends connected to afford a support for the elevator unit 27. Unit 27 includes a traveling canvas 28 and a sickle bar 29 located at the lower end of the unit. Unit 27 also includes side walls 30 and a divider 31 located on the grain side of the harvester, see Fig. 2.

A sickle 32 is associated with the sickle bar 29, and is actuated through the medium of a pitman rod 33 connected with a crank 34 in the usual manner. The sickle and the bar 29, together with the unit 27 are of generally conventional structure so far as general operation is concerned. The canvas 28 passes over a roller 35 at the lower end of the unit 27 and around a roller 36 at the upper end of the unit. Grain or other crops cut by the sickle 32 is delivered onto the canvas 28 which travels to move the material rearwardly of the unit 27.

Roller 35 is of the idler type, but roller 36 is power driven for moving the canvas 28. Figs. 2 and 9 illustrate a grooved wheel 37 fixedly connected with the roller 36 for connection with a V-belt 38 which passes over a grooved wheel 39 keyed to a shaft 40 which operates the cutting cylinder 41, see Figs. 5, 6 and 9. Cutting cylinder 41 includes a plurality of spiral blades 42 arranged in cutting relation with a fixed blade 43, see Fig. 5. Blade 43 is mounted on a support 44 inside the throat 45 of the cylinder housing 46. Corrugated feed rolls 47 and 48 are mounted inside the throat 45 between the upper end of the canvas 28 and the cylinder cutter 41. Roller 48 has a shaft 49 arranged for vertical movement in slots 50 in the side walls of the throat 45. Springs 51 are associated with the shaft 49 for exerting downward pressure on the roll 48 to hold the latter in feeding relation with respect to the roller 47.

Figs. 2 and 9 illustrate a grooved wheel 52 keyed to a shaft 53 to which the wheel 37 is also keyed. A V-belt 54 passes over the grooved wheel 52 and about a grooved wheel 55 keyed to the shaft 491 for driving the roller 47. Cylinder cutter 41 rotates in the direction of the arrow 56 in Fig. 5, and the belt 38 of Fig. 9 is crossed so that the roller 47 is rotated in the direction of the arrow 51 of Fig. 5.

Fig. 6 illustrates the blades 42 as being fixedly related to the shaft 40 through the medium of supports 58 and diagonal brace members 59 all of which are respectively connected with hubs 60 keyed to the shaft 40. To the end of the shaft 40 opposite the grooved wheel 39 I key a bevel gear 61, see Figs. 6, 7, 8 and 14. Fig. 14 illustrates a dog clutch member 62 keyed to the shaft 40 adjacent the bevel gear 61 for coaction with a dog clutch part 63 in the nature of a sleeve splined to a shaft 64 axially positioned with respect to the shaft 40 and extending through an opening 65 in the wall 66 of a housing 67 secured to one side wall of the throat 45.

A bevel gear 68 is keyed to the shaft 64 for meshing engagement with a drive gear 69, see Figs. 7 and 8. In Fig. 14, a compression spring 70 is interposed between the bevel gear 68 and the dog clutch part 63. The clutch part 63, while being keyed for rotation with the shaft 64, is slidable longitudinally of the shaft 64 so as to be urged into clutching engagement with the clutch part 62. However, the teeth 71 on the clutch parts 62 and 63 are so angularly arranged as to cause relative slipping in one direction but to effect positive driving connection in the opposite direction of rotation. Accordingly, in cases where the gear 69 might be suddenly stopped, the cutting cylinder 41 is free to continue rotation because of its inertia so as to relieve the affected gears of forces incident to sudden stopping of the cylinder cutter.

To the shaft 64 I key a grooved wheel 72 for connection with a V-belt 73, see Fig. 7, passing around a grooved wheel 74 keyed to the shaft 49 which carries the roller 48. The rollers 47 and 48 are driven at the same peripheral speed as the canvas 28. In Fig. 7, a grooved belt tightening wheel 75 is associated with the belt 73 and is tensioned against the belt by a spring 76, see Figs. 3 and 4, so as to maintain proper tension on the belt, as when the roller 48 is shifted vertically by reason of bulk variation in the material being fed to the cylinder cutter.

Gear 69 is keyed to a shaft 77 rotatably supported in a bearing 78, see Fig. 8, and the shaft is also supported by a bearing 79 secured to the frame member 26 on that side of the machine, see Fig. 1. A universal joint 80 is interposed in the shaft 77 and the shaft has a splined connection 81 with a shaft section 82 connected with the crankshaft 34 through the medium of a universal joint 83. In Fig. 13, the crankshaft 34 is provided with a clutch plate 84 and is bored at 85 for loosely receiving a shaft 86 connected with a universal joint 87. A movable clutch plate 88 is mounted on the shaft 86 and is urged against the plate 84 by a spring 89 interposed between the plate 88 and a plate 90 maintained in fixed, spaced relation with a plate 91 through the medium of bolts 92. Plate 91 is mounted on the crankshaft 34 and abuts the plate 84 in such manner as to coact with the plate 90 for holding the spring 89 under compression. Thus the shaft 86 is frictionally connected with the crankshaft 34 to rotate with the latter as a unit under normal cutting conditions. In the event that the sickle becomes blocked, the shaft 86 may be rotated relatively to the crankshaft 34. Plate 88 is keyed at 93 to the shaft 86 but the key extends through a slot 94 in the shaft to permit the spring 89 to maintain the plate 88 in proper frictional engagement with the plate 84.

In Fig. 2, the crankshaft 34 is enclosed in a housing 95, and the universal joint 87 is connected with a shaft 96 connected with a power take-off shaft 97 of a tractor 98 through the medium of a universal joint 99. Shaft 96 is sectional and the sections are operatively united through the medium of a splined connection 100. Thus the sickle 32 and the pinion 69 are driven through the medium of a single shaft unit, with the shaft 96 so devised as to accommodate turning of the tractor 98 relatively to the harvester.

To the draw plate 101 of the tractor 98 I pivotally connect a draw beam 102, as by a bolt 103, and the draw beam 102 is fixedly connected with the frame 23 through the medium of structural members 104. The rear end of the draw beam 102 is mounted on the axle 22 by a bearing 105, see Fig. 1. Draw beam 102 is also connected with the frame 23.

The reel 106 is mounted on a shaft 107 rotatably journaled in the forward ends of reel racks 108 pivotally mounted at 109 to frames 110 secured to each of the side walls 30. To the rear ends of the reel racks 108 I connect cables 111 which are wound on drums 112 secured to a shaft 113 rotatably mounted to and underneath the unit 27. To one end of the shaft 113, see Fig. 1, I connect a pinion 114 which is arranged in mesh with a rack 115 on a bar 116 having its forward end pivotally connected with a lever 117. The rack 115 is held in mesh with the pinion 114 by reason of a guide wheel 118 rotatably mounted on a shaft 119 secured to one of the side walls 30, see Fig. 4. In Fig. 1, the lower end of the lever 117 is pivoted to a suitable support 120 attached to the draw beam 102, and a quadrant 121 is provided for the lever so that the latter may be latched in different positions. Thus pivotal movement of the lever 117 imparts reciprocatory motion to the bar 116 which in turn causes rotation of the pinion 114 through the medium of the rack 115. Accordingly, the cables 111 may be adjusted for length to raise or lower the reel unit 106.

Rotation of the reel unit 106 is attained through the medium of a V-belt 122 passing over a grooved wheel 123 secured to the shaft 107. Bars 124 have their upper ends loosely connected with the shaft 107 and their lower ends are loosely connected with a shaft 125 which carries grooved wheels 126 and 127, see Fig. 2. Belt 122 passes over the grooved wheel 127, while a belt 128 passes around the grooved wheel 126 and a grooved wheel 129 fixedly secured to the axle 22. Bars 130 have their rear ends loosely connected with the axle 22 and their forward ends loosely connected with the shaft 125. Thus the bars 124 function as an arm which is pivotally connected with the bars 130, which also function as an arm pivotally connected with the axle 22. Accordingly, the reel racks 108 may be pivoted about the axis 109 for raising or lowering the reel unit 106, and the bars 124 and 130 are loosely connected so as to accommodate vertical adjustment of the reel 106, with the two sets of bars accommodating reel adjustment but maintaining the belts 122 and 128 taut in all positions of the reel.

Unit 27 is adjustable to vary the elevation of the cutting bar 29. Shaft 53 has its ends rotatably journaled in the side walls of the throat 45 and the side walls 30 are loosely mounted on the shaft 53 so that the latter constitutes a pivotal mount for the unit 27. An upright 131 is secured to each of the diagonal brace members 26 and the frame 23, and each upright is provided with a grooved wheel 132 about which a cable 133 passes. One end of each cable 133 is fixedly secured at 134 with the adjacent side wall 30, and the opposite end of each cable is connected with a drum 135 fixed to a shaft 136 rotatably mounted on the frame 23, as well as the draw beam 102, best illustrated in Fig. 2.

To one end of the shaft 136 I fixedly connect a bevel gear 137 meshing with a bevel gear 138 fixed to a shaft 139 rotatably journaled in supports 140 bolted to the draw beam 102. The forward end of the shaft 139 is provided with a handwheel 141, and the handwheel is provided with notches 142 for selective reception of a latch bar 143 pivotally connected with a support 144. Thus the unit 27 may be adjusted about the shaft 53 as an axis through rotation of the handwheel 141, and the handwheel may be latched in different positions for supporting the unit 27 in different positions.

Shafts 82 and 96, in being provided with universal joints 80, 83 and 87 and 99, respectively, permit vertical adjustment of the unit 27, and the splined connections 81 and 100 accommodate relative lengthwise movement of the shaft sections. Splined connection 100 also accommodates relative longitudinal movement of the sections of the shaft 96 during relative turning of the tractor 98, at which time the universal joints 87 and 99 are also brought into play.

Material delivered to the cutting cylinder 41 is cut into predetermined lengths, and the cut material falls into a throat 145 to be delivered onto a conveyor belt or canvas 146. Fig. 3 illustrates the canvas 146 as being located partly inside a chute 147 having a delivery spout 148. The canvas passes over rollers 149 and 150, with the roller 149 positively driven through the medium of a V-belt 151 passing over a grooved wheel 152 secured to the shaft 153 fixed to the roller 149. Belt 151 passes around a grooved wheel 154 fixed to a shaft 155 rotatably journaled in a bearing 156, see Fig. 8. A bevel gear 157 is keyed to the shaft 155 and arranged in mesh with the bevel gear 61 to be driven thereby. Fig. 3 illustrates the canvas 146 as being provided with cleats 158 for elevating the cut material. Nozzle 148 is located sufficiently high to permit a wagon 159 to be positioned thereunderneath for ensilage collecting purposes, see Fig. 2. The tongue 160 of the wagon is pivotally connected at 161 with one end of a beam 162 pivotally connected at 163 with an arm 164 pivotally connected at 165 with the draw beam 102. The forward end of of the beam 162 is pivotally connected at 166 with the draw plate 101 of the tractor. Arm 164 may be provided with a series of openings 167 to permit the beam 162 to be shifted to different positions depending upon the width of the wagon 159.

Chute 147 is sectional and the sections 168 are detachably connected through the medium of bolts 169 passing through flanges 170 fashioned on the sections. Roller 150 is spring tensioned, as at 171, to hold the belt 146 under proper tension.

Fig. 15 illustrates a slip clutch for the reel 106, which slip clutch comprises a friction face 172 on one side of the grooved wheel 123. A friction plate 173 is keyed to the shaft 107 and a compression spring 174 is positioned between the opposite face of the wheel 123 and a collar 175 keyed to the shaft 107. Wheel 123 is urged against the friction plate 173 for imparting rotation to the shaft 107, but the wheel may rotate relatively to the shaft in the event that the reel 106 is blocked.

In Figs. 10, 11 and 12, I illustrate the specific construction of the belt 28, which also applies to the belt 146. The belt 28 is provided with cleats 176 at suitable intervals. In Fig. 11, the belt 28 is looped at 177 to lie against the two side faces and one edge face of a bar 178 which extends the full width of the belt. A U-shaped bar 179 is slipped over the loop 177, and the bar is securely clamped to the loop and the bar 178 by screws 180 spaced at suitable intervals. Bar 179 is provided with curvatures 181 for engagement with the belt 28 so as to reduce wear thereon. Belt 28, together with the belt 146, is water-resistant so as not to be affected by moisture conditions. The belt may comprise suitably rubberized material.

Fig. 12 illustrates the belt 28 as having a fold 182 along one edge, but both edges are similarly formed, with the fold 182 lying in a recess 183 in the bar 178 so that the wall 184 of the bar 179 will have uniform pressure with the loop 177 throughout its entire length. Both side walls 30 are each provided with an angle 185 which constitutes a track or support for the upper run of the belt.

Cylinder housing 46 includes a cover 186 having a hinge connection 187 with the throat 145 to facilitate inspection of and service to the cylinder cutter as well as the feed rolls. Blades 42 are connected with the supports 58 through the medium of bolts 188 to permit quick and easy substitution of blades in the event of damage thereto. At the same time, alternate blades may be removed to cut the crop in longer lengths.

Having thus described certain embodiments of my invention in detail, it is, of course, understood that I do not desire to limit the scope thereof to the exact details set forth except insofar as those details may be defined in the appended claims.

I claim:

1. In combination with a tractor having a power take-off shaft, an ensilage harvester comprising a wheeled support having a draw means pivotally connected with the tractor, a cutting mechanism for standing growths, including a cutting knife, an ensilage cutting mechanism mounted on said wheeled support, a conveyor unit mounted on said wheeled support for moving the cut growths to the ensilage cutting mechanism, a shaft means operatively connecting said power take-off shaft with said ensilage cutting mechanism, a drive connection between said shaft means and said cutting knife, universal joint means interposed in said shaft means, splined joint means interposed in said shaft means, said universal joint means and said splined joint means causing said shaft means to lengthen or shorten and bend when said tractor is turned relatively to the harvester, said conveyor unit being pivotally mounted on said wheeled support and said cutting mechanism being carried by the conveyor unit, a reel pivotally mounted on said conveyor unit, drum means mounted on said conveyor unit, cable means wound on said drum means and connected with said reel, a lever actuated rack means operatively connected with said drum means for actuating the latter, with said lever located to be manually accessible by the operator on the tractor, drum means mounted on said wheeled support, cable means connected with said conveyor unit and said last-mentioned drum means, a rotative shaft having geared connection with said last-mentioned drum means to actuate the latter for raising and lowering said conveyor unit, a handwheel keyed to said rotative shaft and located to be manually accessible by the operator of the tractor, and means coacting with said handwheel to latch the latter against rotation for supporting the conveyor unit in elevated positions.

2. In combination with a tractor having a power take-off shaft, an ensilage harvester comprising a wheeled support having a draw means pivotally connected with the tractor, a cutting mechanism for standing growths, including a cutting knife, an ensilage cutting mechanism mounted on said wheeled support, a conveyor unit mounted on said wheeled support for moving the cut growths to the ensilage cutting mechanism, a shaft means operatively connecting said power take-off shaft with said ensilage cutting mechanism, a drive connection between said shaft means and said cutting knife, universal joint means interposed in said shaft means, splined joint means interposed in said shaft means, said universal joint means and said splined joint means causing said shaft means to lengthen or shorten and bend when said tractor is turned relatively to the harvester, said conveyor unit being pivotally mounted on said wheeled support and said cutting mechanism being carried by the conveyor unit, a reel pivotally mounted on said conveyor unit, drum means mounted on said conveyor unit, cable means wound on said drum means and connected with said reel, a lever actuated rack means operatively connected with said drum means for actuating the latter, with said lever located to be manually accessible by the operator on the tractor, drum means mounted on said wheeled support, cable means connected with said conveyor unit and said last-mentioned drum means, a rotative shaft having geared connection with said last-mentioned drum means to actuate the latter for raising and lowering said conveyor unit, a handwheel keyed to said rotative shaft and located to be manually accessible by the operator of the tractor, means coacting with said handwheel to latch the latter against rotation for supporting the conveyor unit in elevated positions, feed rolls located between the conveyor unit and said ensilage cutting mechanism, a driving connection between said ensilage cutting mechanism and said conveyor unit, a driving connection between said last-mentioned driving connection and one of said feed rolls, and a driving connection between the other feed roll and said shaft means.

3. In combination with a tractor having a power take-off shaft, an ensilage harvester comprising a wheeled support having a draw means pivotally connected with the tractor, a cutting mechanism for standing growths, including a cutting knife, an ensilage cutting mechanism mounted on said wheeled support, a conveyor unit mounted on said wheeled support for moving the cut growths to the ensilage cutting mechanism, a shaft means operatively connecting said power take-off shaft with said ensilage cutting mechanism, a drive connection between said shaft means and said cutting knife, universal joint means interposed in said shaft means, splined joint means interposed in said shaft means, said universal joint means and said splined joint means causing said shaft means to lengthen or shorten and bend when said tractor is turned relatively to the harvester, said conveyor unit being pivotally mounted on said wheeled support and said cutting mechanism being carried by the conveyor unit, a reel pivotally mounted on said conveyor unit, drum means mounted on said conveyor unit, cable means wound on said drum means and connected with said reel, a lever actuated rack means operatively connected with said drum means for actuating the latter, with said lever located to be manually accessible by the operator on the tractor, drum means mounted on said wheeled support, cable means connected with said conveyor unit and said last-mentioned drum means, a rotative shaft having geared connection with said last-mentioned drum means to actuate the latter for raising and lowering said conveyor unit, a handwheel keyed to said rotative shaft and located to be manually accessible by the operator of the tractor, means coacting with said handwheel to latch the latter against rotation for supporting the conveyor unit in elevated positions, feed rolls located between the conveyor unit and said ensilage cutting mechanism, a driving connection between said ensilage cutting mechanism and said conveyor unit, a driving connection between said last-mentioned driving connection and one of said feed rolls, a driving connection between the other feed roll and said shaft means, an ensilage elevator mounted on said wheeled support, and a driving connection between said ensilage elevator and said shaft means.

JAMES W. LINDLY.